Jan. 16, 1934. W. D. HAILES Re. 19,046
TRAIN DISPATCHING SYSTEM FOR RAILROADS
Original Filed Oct. 23, 1929 2 Sheets-Sheet 1
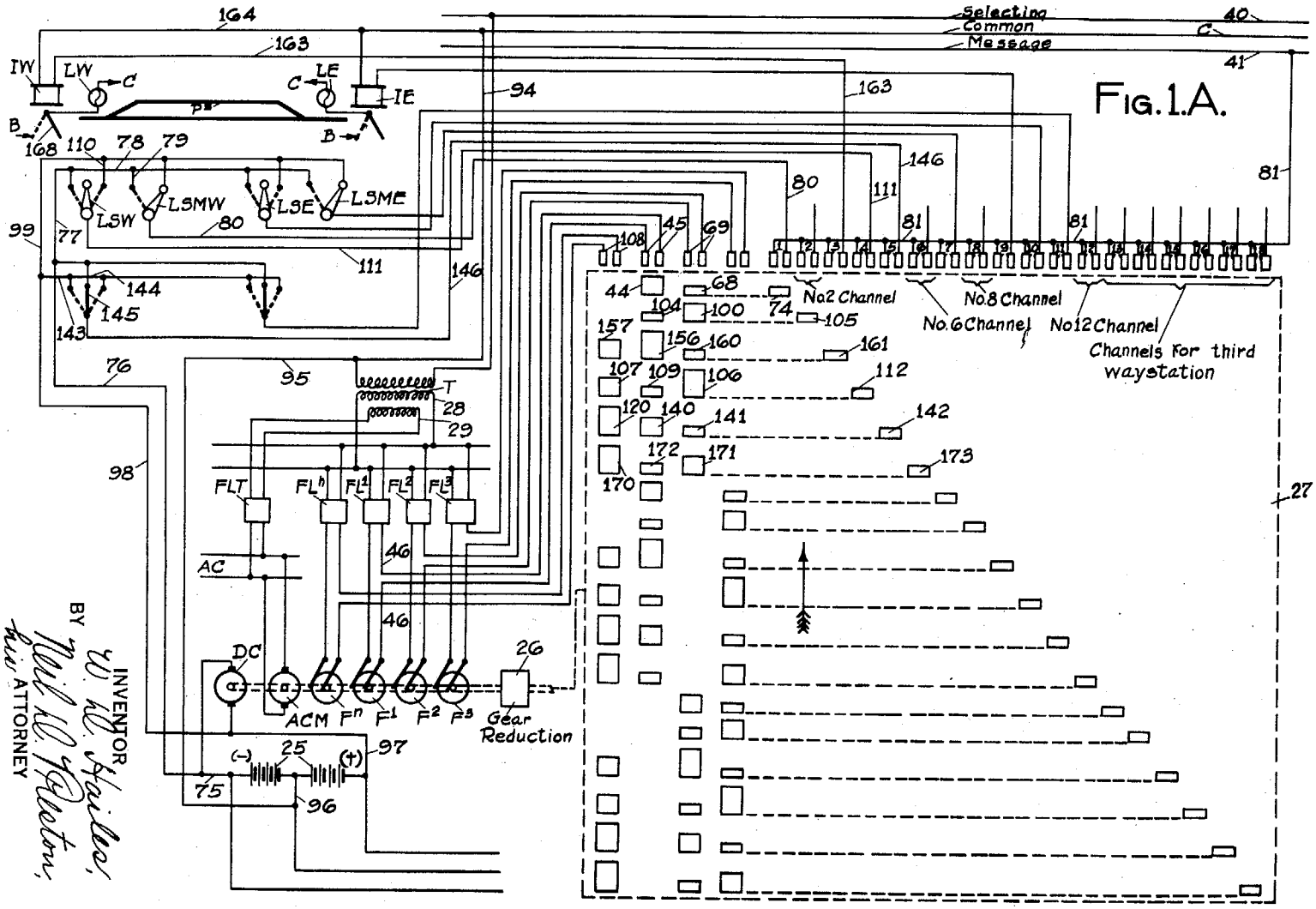
INVENTOR
W. D. Hailes,
BY
Neil H. Preston,
his ATTORNEY TRAIN DISPATCHING SYSTEM FOR RAILROADS
Original Filed Oct. 23, 1929 2 Sheets-Sheet 2
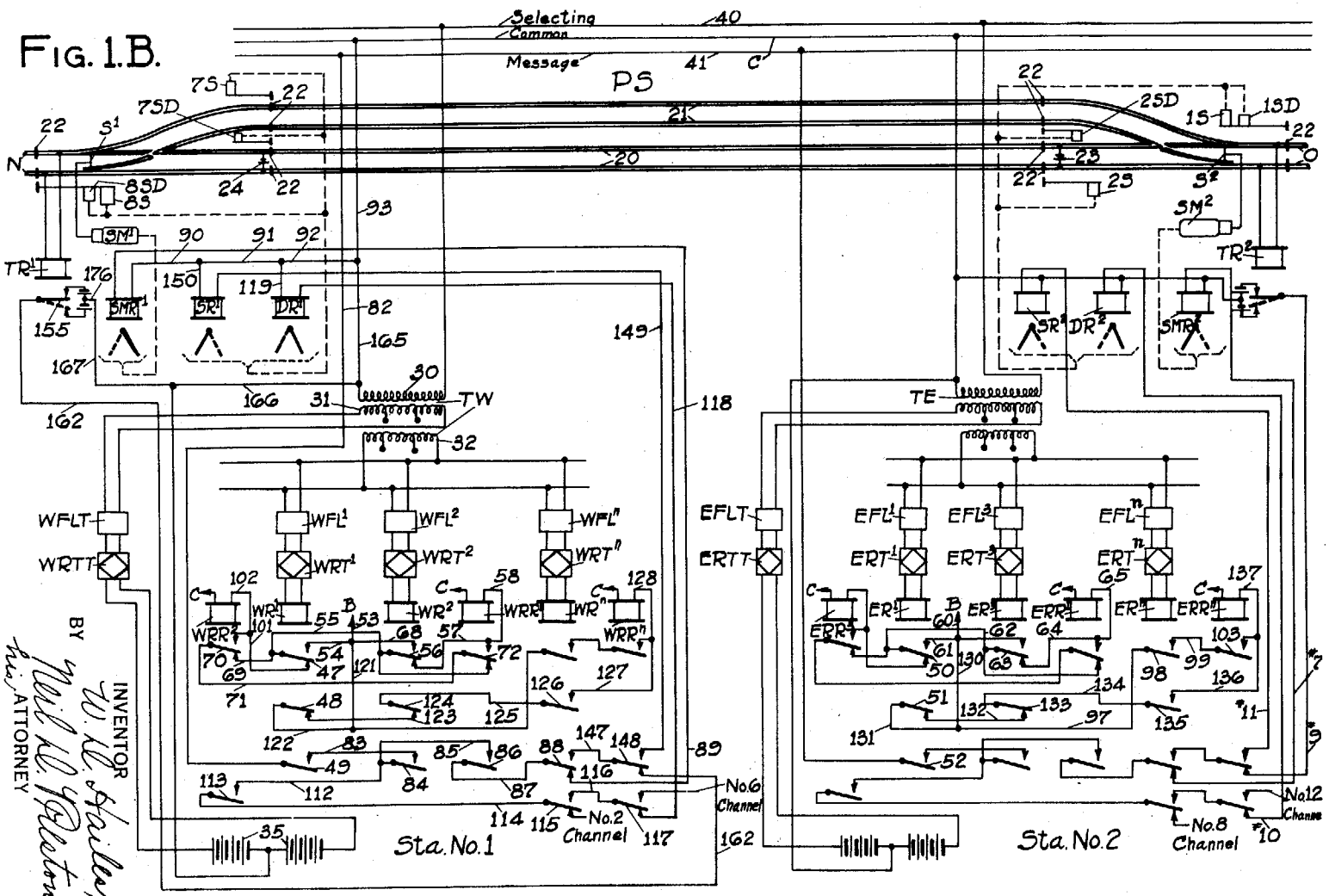
FIG. 1.B.
INVENTOR
W. D. Hailes,
BY
Neil H. Preston,
his ATTORNEY Reissued Jan. 16, 1934

Re. 19,046

UNITED STATES PATENT OFFICE 19,046

TRAIN DISPATCHING SYSTEM FOR RAILROADS

William D. Hailes, Brighton, N. Y., assignor to General Railway Signal Company, Rochester, N. Y.

Original No. 1,824,135, dated September 22, 1931, Serial No. 401,729, October 23, 1929. Application for reissue July 13, 1932. Serial No. 622,364

31 Claims. (Cl. 246—3)

This invention relates to train dispatching systems, and more particularly to a system of the synchronous selector type in which contacts at different locations on a railway system are closed in synchronism through the medium of distinctive control impulses.

In dispatching the movement of trains over a large railway system, through the medium of wayside signal indication, it is not only necessary to control certain wayside signals, but it is also necessary to indicate to the dispatcher the progress of trains along the track. Since this control of wayside signals and indication of train progress must extend for many miles from the dispatcher's office, it is obvious that the transmission of these controls and indications should require as few line wires as possible.

In view of the foregoing and other important considerations, it is proposed, in accordance with the present invention, to simultaneously close contacts at the dispatcher's office and the way stations in synchronism, through the medium of a plurality of distinctive frequencies transmitted from the dispatcher's office to such distant way stations, and to transmit over the message circuits completed by such simultaneously closed contacts currents distinctive in character, such as a direct current of a particular polarity, and in this way, transmit a large number of distinctive indications in rapid sequence. In accordance with the present invention the contacts at the distant way stations, to establish particular channel circuits, are not only closed by the application of a plurality of distinctive frequencies in combination, but the closure of such contacts is also dependent upon the order in which such plurality of frequencies are transmitted to the distant way stations.

Other objects, purposes and characteristic features of the present invention are in part obvious from the accompanying drawings and will in part be more particularly described hereinafter.

In describing the invention in detail reference will be made to the accompanying drawings in which:—

Fig. 1A conventionally illustrates the apparatus in a local dispatcher's office; and, Fig. 1B shows conventionally a distant passing siding, of a railway system, having a way station at each end thereof for controlling the signals and switch machines located at that end, by a poly-frequency synchronous selector system embodying the present invention.

These Figs. 1A and 1B when laid end to end constitute a portion of the complete system.

*Structure*

Referring to Fig. 1B of the drawings, there has been shown a passing siding PS, constituting a main track having rails 20, and a side track having rails 21. The usual detector track circuit at each end of the passing siding PS are insulated from the rest of the track by insulating joints 22. The side track is connected to the main track at the west end of the passing siding PS through the medium of a track switch $S^1$, whereas there is located a similar track switch $S^2$ at the east end of the passing siding PS. The detector track circuit at the east end of the passing siding includes a track relay $TR^2$ and a battery 23, and the track circuit at the west end of the passing siding PS include the track relay $TR^1$ and track battery 24. The track switch $S^2$ at the east end of the passing siding is controlled by switch machine $SM^2$, and the track switch $S^1$ at the west end of the passing siding PS is controlled by the switch machine $SM^1$. At the east end of the passing siding PS are located starting signals 2S and 2SD, these signals are of the stop-and-stay type which govern the movement of traffic off of the main track and off of the side track of the passing siding PS into the single track section; whereas traffic is governed from the single track section into the main track or side track through the medium of the entering signal 1S and the take-siding signal 1SD, respectively. It may be pointed out here, that these various signals in the case of a single track railway system constitute part of the usual absolute-permissive-block signal system. Similarly, the west end of the passing siding PS has associated therewith an entering signal 8S a take-siding signal 8SD and two starting signals 7S and 7SD.

The signals at the west end of the passing siding PS are preferably controlled in accordance with traffic conditions and in accordance with the positions assumed by the signal relay $SR^1$ and the direction relay $DR^1$, which relays are controlled through the medium of the synchronous selector system. Likewise, the switch machine $SM^1$ is controlled by the switch machine relay $SMR^1$. Also, at the east end of the passing siding PS is a switch machine relay $SMR^2$ for controlling the switch machine $SM^2$, and there are located signal control relays $SR^2$ and $DR^2$ for controlling the signals at the east end of the passing siding PS.

It may be pointed out here, that the manner in which these signal and switch machines are controlled by relays $SR^2$, $DR^2$ and $SMR^2$ at the east end of the passing siding PS, has been described in detail in the prior patent to S. N. Wight, No. 1,889,457, issued Nov. 29, 1932, and the apparatus for obtaining such control has for convenience been illustrated conventionally by dotted lines connecting these devices.

In the dispatcher's office is preferably reproduced in miniature the entire railway system, over which the dispatcher has supervision, and since for convenience only two distant way stations of the railway system have been illustrated, there is similarly reproduced in the dispatcher's office in miniature the passing siding *ps* only. With the east end of this miniature passing siding *ps* is associated a signal lever LSE and a switch machine lever LSME, through the medium of which levers are controlled the signals and switch machine at the east end of the passing siding PS, and similarly there is associated with the east end of the passing siding *ps* an indicating lamp LE, for indicating by its illumination the occupancy of the detector track circuit associated with the east end of the passing siding PS. Also, there are associated with the west end of the passing siding *ps* the levers LSW and LSMW for controlling the signals and switch machine, respectively, associated with the west end of the passing siding PS. This west end of the miniature passing siding *ps* is also provided with an indication lamp LW, for indicating the occupancy of the detector track circuit at the west end of the passing siding PS. The indicating lamp LE is controlled by the indicating relay IE, and indicating lamp LW is controlled by the indicating relay IW.

In the above description reference has been made to certain control relays, and levers for controlling the same, and also indicating relays and track circuits for controlling the same, and it is now desired to point out how these control relays are controlled by the levers in question, and how the indicating relays are controlled by the track circuits in question, through the medium of a synchronous multiple frequency selected control system. Let us first briefly consider the synchronous selector apparatus located in the dispatcher's office.

In the dispatcher's office is a source of alternating current AC, which may be of any suitable frequency, but is assumed to be a 60 cycle source, which source feeds the alternating current motor ACM. This motor ACM drives a direct current generator DC, which charges the storage batteries 25, and this motor also drives a plurality of alternating current generators of distinctive frequencies, such as the generators $F^n$, $F^1$, $F^2$ and $F^3$. This motor generator set is intended to be maintained in operation upon failure of the alternating current source AC, through the medium of the direct current generator acting as a motor during such power failure. This 60 cycle source AC is also fed onto a selecting or stepping circuit, and through the medium of transformers, such as TW and TE, feeds rectifiers WRTT and ERTT through the medium of filters WFLT and EFLT, these filters being necessary to prevent the flow of the other distinctive frequencies to these rectifiers, and the rectifiers being used to charge the batteries of the corresponding way stations.

This motor generator through the medium of reduction gearing 26 drives a commutator drum 27, which has been shown developed for the purpose of illustrating more clearly how the commutator segments are spaced with respect to each other and the contacts they engage. The generators $F^n$, $F^1$, $F^2$ and $F^3$ are connected to the primary winding 28 of the transformer T through the medium of filtering devices $FL^n$, $FL^1$, $FL^2$ and $FL^3$, and similarly, the alternating current source AC is connected to the primary winding 29 of the transformer T through the medium of a filtering device FLT. These filters are designed to permit the free flow of the alternating current; it is to permit the flow and greatly restricts the flow of all the other alternating currents, the exponent of each filter reference character denoting the frequency it will allow to flow.

Referring now to way station No. 1 (see Fig. 1B), this way station is provided with a similar transformer TW, having a primary winding 30 connected across the selecting and common wire, having a secondary winding 31 connected to a filter WFLT, which filter is constructed to permit only the flow of current of the frequency of the source AC, and having a secondary winding 32 which is connected to relays $WR^1$, $WR^2$ and $WR^n$ through the medium of filter $WFL^1$, $WFL^2$, $WFL^n$ and rectifiers $WRT^1$, $WRT^2$ and $WRT^n$. The filter WFLT, just referred to, through the medium of the rectifier WLTT charges the storage battery 35 located at that way station. The relays $WR^1$, $WR^2$ and $WR^n$ control the repeater relay $WRR^1$, $WRR^2$ and $WRR^n$ in a manner as described in the operation of the system hereinafter.

Similarly, way station No. 2 is provided with filters EFLT, $EFL^1$, $EFL^3$, $EFL^n$, is provided with rectifiers ERTT, $ERT^1$, $ERT^3$ and $ERT^n$ and with distinctive frequency relays $ER^1$, $ER^3$ and $ER^n$. These distinctive frequency relays $ER^1$, $ER^3$ and $ER^n$ control the repeater relays $ERR^1$, $ERR^3$ and $ERR^n$ in a manner as described in the operation hereinafter. It is desired to point out at this time, that each of the filters illustrated is constructed to allow only current to flow having a frequency corresponding to that of the exponent of the reference character for such filter, and similarly that the relays connected to these filters, although they are direct current relays, will respond only when currents of frequencies corresponding to the exponent of the reference character of a particular relay is applied to the associated filter. Having now made reference to the various elements of the system, it is deemed expedient to consider the operation of the system, bearing in mind that the particular embodiment of the invention illustrated is merely typical and has been selected to facilitate description of the invention, its principal of operation and the characteristic features thereof.

*Operation*

The polyfrequency or multifrequency synchronous selector system of the present invention is presumably one in which the commutator 27 is continuously rotating, and during such rotation sequentially applies between the stepping or selecting wire 40 and the common return wire C, alternating currents of various frequencies in over-lapped relation. Similarly this commutator sequentially connects the various indicating relays IW and IE, and the various levers LSW, LSMW, LSE and LSME between the message wire 41 and the common return wire C. As these various distinctive frequencies of alternating current are applied across the stepping and common wire, they are adapted to flow through the various transformers TW and TE, and each particular frequency only may pass through the filter of corresponding frequency construction, having an exponent corresponding to that frequency, to cause the associated relay, also having an exponent corresponding to said frequency, to assume the attracted position. In other words, as the commutator 27 is rotated, the various distinctive frequency relays at the various way stations, which respond to the frequencies transmitted, will assume their attracted position so long as such frequency is transmitted, so that the distinctive frequency alternating current relays in the field bob-up and again fall in synchronism with the sectors on the commutator 27 which apply such frequency to the stepping circuit. In order to more clearly visualize, how this action of distinctive frequency relay operation at the way stations in synchronism with the engagement of certain contacts on the commutator 27 with their associated brushes, sets up distinctive channel circuits, specific lever movements as well as track relay changes will be considered.

Let us assume that the dispatcher wishes a train, moving from left to right in the single track section N, to pass into the side track of the passing siding PS. In order to accomplish this, the dispatcher will move this switch machine lever LSMW to the left hand dotted position, this for the purpose of operating the switch machine relay $SMR^1$ to the dotted position, which in turn will effect operation of the switch machine $SM^1$ to the take-siding position. As the commutator is rotated in the direction of the arrow, the first thing that happens is the commutator segment 44 engages the stationary brushes 45, completes a circuit for the passage of frequency $F^1$ to flow, in that the brushes 45 are contained in series with the wire 46, connecting the generator $F^1$ to the filter $FL^1$.

With this frequency $F^1$ applied to the selecting circuit, the relays $WR^1$ and $ER^1$ at the way stations No. 1 and No. 2, respectively, are energized, this because they are the only relays in the arrangement shown connected to the stepping wire through filters which permit the flow of current at frequency $F^1$, the contacts 47, 48, 49, 50, 51 and 52 of these relays thus assume the attracted position. Upon lifting of these contacts the following energizing circuits are completed for the relays $WRR^1$ and $ERR^1$, respectively:—

(1) Beginning at the terminal B of a suitable way station source, wires 53 and 54, front contact 47 of the relay $WR^1$, wire 55, back contact 56 of the relay $WR^2$, wires 57 and 58, winding of the relay $WRR^1$ to the other terminal C of said battery; and (2) Starting at the terminal B of a battery at way station No. 2, wires 60 and 61, front contact 50 of the relay $ER^1$, wire 62, back contact 63 of the relay $ER^3$, wires 64 and 65, winding of the relay $ERR^1$, to the other terminal of said battery. The relays $WR^1$, $WRR^1$, $ER^1$ and $ERR^1$ are thus energized, but this does not have any effect insofar as the control of messages is concerned, because these relay changes do not complete any mesage circuit.

Referring again to the commutator 27, it will be noted that after a short time the commutator segment 68 connects the brushes 69 together, and in so doing permits the flow of alternating current from the generator $F^2$ to the transformer T through a circuit including the filter $FL^2$, and this current flows to the way station No. 1 and causes the relay $WR^2$ to assume its energized position, and since there is no filter at the way station No. 2 which permits the flow of frequency $F^2$ there is no relay at station No. 2 which responds.

With the relays $WR^1$ and $WRR^1$ at way station No. 1 assuming their attracted position and with the relay $WR^2$ moved to the attracted position, the frequency $F^1$ still flowing and holding relay $WR^1$ energized, the raising of the contact 56 of the relay $WR^2$ breaks the pick-up circuit for the relay $WRR^1$, but this relay $WRR^1$ remains energized through the following stick circuit:—beginning at the terminal B, wires 53 and 68, front contact 56 of the relay $WR^2$, (or wires 53 and 54 and front contact 47 of relay $WR^1$), wires 55 and 69, back contact 70 of the relay $WRR^2$, wire 71, stick contact 72 of the relay $WRR^1$, wire 58, winding of the relay $WRR^1$ to the other terminal C of said battery. The relays $WR^1$, $WR^2$ and $WRR^1$ are thus energized, but the relay $WRR^2$ is deenergized and can not be energized until the relay $WR^1$ is again deenergized.

Bearing these positions of the relays at station No. 1 in mind, let us see what will happen as the commutator rotates a little further and causes the commutator segment 74 to engage the brushes 1. As this happens, the following message circuit extending from the dispatcher's office to the way station No. 1 is completed:—starting at the negative terminal of the battery 25, wires 75, 76, 77, 78 and 79, switch machine lever LSMW assuming its left hand dotted position, wire 80, commutator drum contact 1, commutator segment 74, stationary contact 1, wire 81, message wire 41, wire 82 (see way station No. 1), front contact 49 of the relay $WR^1$, wire 83, front contact 84 of the relay $WR^2$, wire 85, front contact 86 of the relay $WRR^1$, wire 87, back contact 88 of the relay $WR^n$, wire 89, winding of the switch machine relay $SMR^1$, wires 90, 91, 92 and 93, to common return wire C connected through the medium of wires 94, 95 and 96 to the mid-point of battery 25. Since the flow of current in the circuit just traced is of negative polarity the switch machine relay $SMR^1$ will be operated to the dotted position, thereby operating the switch machine $SM^1$ to the take siding position. In this connection it should be understood that these switch machine relays $SMR^1$ and $SMR^2$ are two-position polar relays of the permanent magnet stick type, which will remain in the position to which they were last operated, by suitable stick action such as the magnetism derived from a permanent magnet included in the structure of such relays. The relay $SMR^1$ thus remains in the left hand position until specially operated back to the right hand position.

Attention is at this time directed to way station No. 2, at which there is no relay which will respond to frequency $F^2$ and for this reason there is no message circuit branch completed at way station No. 2. At certain other stations there will be relays connected to filters which permit the flow of frequency $F^2$, but at such other way stations there are no relays which respond to frequency $F^1$, so that there is only one message circuit completed under the circumstance just discussed, and this message circuit includes the relay $SMR^1$ as above pointed out.

Since the dispatcher intends to have the train pass onto the side track of the passing siding PS, he will of course endeavor to clear the take siding signal 8SD, and in order to do this he will operate the signal lever LSW to the right hand position. As the commutator 27 rotates a little further the segments 44, 68 and 74 will have disengaged their associated stationary contacts, and the various distinctive frequency relays which were energized through the medium of these segments will again return to their retracted position, thus opening the message circuit heretofore closed. As the commutator 27 rotates still a little further the contact segment 100 will engage the stationary contacts 69, thereby causing the various relays which respond to the frequency $F^2$ to assume their energized position.

Referring to station No. 1 energization of the relay $WR^2$ will effect energization of the repeater relay $WRR^2$ through the following circuit:—beginning at the terminal B of the way station battery, wires 53 and 68, front contact 56 of the relay $WR^2$, wire 55, back contact 47 of the relay $WR^1$, wires 101 and 102, winding of the relay $WRR^2$ to the terminal C of said way station battery. It should be noted that way station 2 does not have a filter which permits the flow of current of frequency $F^2$, so that no relay is energized at station No. 2.

A slight further rotation of the commutator 27 causes the segment 104 to engage the stationary brushes 45, thereby causing the flow of current of frequency $F^1$ from the generator $F^1$ and through the filter $FL^1$. The impression of this frequency $F^1$ across the selecting wire and common, causes the relays $WR^1$ and $ER^1$ to assume their energized positions. Energization of the relay $WR^1$, bearing in mind that the relays $WR^2$ and $WRR^2$ already assume their attracted position, causes no further change than the lifting of contacts 47, 43 and 49 at station No. 1. Also, the closure of contact 47 of relay $WR^1$ merely shunts the already closed contact 56 of the relay $WR^2$, this actuation of the relay $WR^1$ however effects opening of contacts 48 and closure of contacts 49. Referring to station No. 2 the movement of the relay $ER^1$ to its attracted position causes the relay $ERR^1$ to pick up in a manner as already described without completing a message circuit at station No. 2. During the present position of the commutator 27, the segment 105 engages the stationary brushes 2 to complete channel No. 2, but since this channel is not connected to any particular lever or any particular control relay it is deemed unnecessary to trace this channel circuit.

Continued rotation of the commutator 27 will effect deenergization of all the distinctive frequency relays as well as such repeater relays as have been picked up by such distinctive frequency relays, as soon as segments 100 and 104 disengage their respective brushes. During the next predetermined arc of rotation of the commutator 27, the segments 156, 157, 160 and 161 will engage their respective brushes, but the functioning of the selector system during this arc of rotation will not be considered at present, this phase of the operation of the system being more properly considered hereinafter when the OS-ing of a train movement will be considered.

Let us now consider the action produced by the commutator when the sector 106 engages the stationary contact 69. Obviously, this will apply frequency $F^2$ to the selecting wire thereby effecting energization of the relay $WR^2$, and in turn energization of the repeater relay $WRR^2$ in a manner as already described, and since there is no relay at way station No. 2 which responds to frequency $F^2$, the apparatus at way station No. 2 may be disregarded. Insofar as other way stations are concerned, the effect produced by this frequency $F^2$ may also be disregarded for reasons already explained. Upon further rotation of the commutator 27 the commutator segment 107 will engage the stationary contacts 108, thereby applying frequency $F^n$ to the selecting circuit, and thereby effecting energization of the relays $WR^n$ and $ER^n$ at stations No. 1 and No. 2, respectively. With the relay $WR^n$ at way-station No. 1 energized, following the energization of the relays $WR^2$ and $WRR^2$, no other repeater relays are picked up at station No. 1, but with only the relays $WR^2$, $WRR^2$ and $WR^n$ picked up there is no message circuit completed. A slight further rotation of the commutator 27 causes the segment 109 to engage stationary brushes 45, which effects the application of frequency $F^1$ to the stepping circuit, thereby effecting energization of the relays $WR^1$ and $ER^1$. Picking up of relay $ER^1$, bearing in mind that relay $ER^n$ has already picked up results in the picking up of relay $ERR^n$ through the following circuit:—B, wires 60, 130 and 131, contact 51, wire 132, contact 133, wire 134, contact 135, wires 136 and 137; this relay $ER^1$ will effect picking up of relay $ERR^1$ through a circuit similar to that already traced for relay $WRR^1$ at station No. 1. Also, picking up of relay $ER^1$ causes the pick-up circuit for the relay $ERR^n$, just traced, to be again broken, but this relay $ERR^n$ is held up through the following stick circuit:—B, wires 60, 130 and 97, contact 98, wire 99, contact 103 and wire 137, back to terminal C. With the relays $ER^n$, $ER^1$ and $ERR^1$ thus energized, there is no message circuit completed at way station No. 2, because all message circuits for way station No. 2 include a front contact of relay $ER^3$ and this relay is deenergized.

Coming back to way station No. 1, the picking up of the relay $WR^1$ does not effect picking of its repeater relay $WRR^1$ because the pick-up circuit for relay $WRR^1$ is open at the back contact 56 of relay $WR^2$. At station No. 1 the relays $WR^2$, $WRR^2$, $WR^n$ and $WR^1$ are thus up at this time, and the following message circuit connecting in the lever LSW and the direction relay $DR^1$ is completed:—beginning at the positive terminal of the battery 25, wires 97, 98, 99 and 110, lever LSW, wire 111, stationary contact 4, commutator segment 112, stationary contact 4, wire 81, message wire 41, wire 82, front contact 49 of the relay $WR^1$, wire 83, front contact 84 of the relay $WR^2$, wire 112, front contact 113 of the relay $WRR^2$, wire 114, front contact 115 of the relay $WR^n$, wire 116, back contact 117 of the relay $WRR^n$, wire 118, winding of the direction relay $DR^1$, wires 119, 92 and 93, to common return wire C connected through the medium of wires 94, 95 and 96 to the mid-point of battery 25. Since the flow of current in the circuit just traced is of positive polarity the direction relay $DR^1$ will remain in the right hand position in which it is shown.

A slight further rotation of the commutator 27 in the direction of the arrow breaks the circuits at the segments 106, 107, 109 and 112. A short time thereafter, namely, when all of the distinctive frequency relays have assumed their retracted position, this commutator applies frequency $F^n$ to the selecting circuit through the medium of segment 120 engaging the stationary brushes 108. The application of the frequency $F^n$ to the selecting circuit causes the relays $WR^n$ and $ER^n$ to assume their attracted positions, in response to which the relays $WRR^n$ and $ERR^n$ will be energized through the following respective circuits:—

(1) Beginning at the terminal B of the battery at way station No. 1, wires 53, 121 and 122, back contact 48 of the relay $WR^1$, wires 123, back contact 124 of the relay $WR^2$, wire 125, front contact 126 of the relay $WR^n$, wires 127 and 128, winding of the relay $WRR^n$ to the return wire C connected to said station battery; and, (2) Beginning at the terminal B of battery at way station No. 2, wires 60, 130 and 131, back contact 51 of the relay $ER^1$, wire 132, back contact 133 of the relay $ER^3$, wire 134, front contact 135 of the relay $ER^n$, wires 136 and 137, winding of the relay $ERR^n$ to the terminal C of the battery at way station No. 2. Bearing now in mind that the relays $WR^n$, $WRR^n$, $ER^n$, and $ERR^n$ assume their attracted position, let us now see what effect movement of the commutator segment 140 into engagement with the stationary contacts 45 will have, in that such engagement will effect in the superimposition of alternating current of frequency $F^1$ on the stepping circuit. At way station No. 1 picking up of the relay $WR^1$ will effect picking up of the relay $WRR^1$, for reasons already explained. Similarly, at way station No. 2 picking up of the relay $ER^1$ will effect picking up of the relay $ERR^1$. With these various relays assuming their energized position no message channel will be completed at stations 1 or 2.

Let us now consider the operation of relays at way stations No. 1 and No. 2 when the commutator segment 141 engages stationary contacts 69, this engagement for obvious reasons applying frequency $F^2$ to the selecting circuit. As already explained there is no relay at way station No. 2 which responds to frequency $F^2$, it will therefore be unnecessary to consider the application of frequency $F^2$ at station No. 2. Referring to a station No. 1 the superimposition of frequency $F^2$ on the stepping circuit with the frequency $F^n$ and $F^1$ already applied in the order given, the picking up of the relay $WR^2$ will produce no effect except the lifting of its contacts 56, 124, and 84, in that relay $WRR^2$ cannot pick up since its pick-up circuit is open at the back contact 47. With the relays $WR^1$, $WRR^1$, $WR^n$, $WRR^n$ and $WR^2$ energized, and with the commutator segment 142 engaging the brushes 5, and bearing in mind that the lever LSW has been moved to the right, the following message circuit will be completed:—beginning at the positive terminal of the battery 25, wires 97, 98, 143 and 144, contact 145 associated with the lever LSW to the right, wire 146, commutator segment 142, wire 81, message wire 41, wire 82, front contact 49 of the relay $WR^1$, wire 83, front contact 84 of the relay $WR^2$, wire 85, front contact 86 of the relay $WRR^1$, wire 87, front contact 88 of the relay $WR^n$, wire 147, front contact 148 of the relay $WRR^n$, wire 149, winding of the relay $SR^1$, wires 150, 91, 92 and 93, common wire C, wires 94, 95 and 96, back to the mid-point of the battery 25. Since the flow of current in the circuit just traced is of positive polarity the signal relay $SR^1$ is operated to its right hand dotted position, in which it clears the take siding signal 8SD, providing traffic conditions in advance are favorable, this of course on the assumption that the switch machine has already moved its track switch $S^1$ to its take siding position, and that the signal direction relay is to the right, as has been assumed.

At the way station No. 2 there is no message channel completed under the last assumed conditions, because relay $ER^3$ is down and each relay message circuit for way station No. 2 includes a front contact of relay $ER^3$.

The take siding signal 8SD now having been cleared, let us assume that the east bound train approaching on the single track section N, accepts this signal 8SD and moves into the side track of the passing siding PS. As the train treads upon the detector track circuit containing the track relay $TR^1$, it will cause the contact 155 of this relay $TR^1$ to assume its retracted dotted position, thereby applying negative polarity from the battery 176 to the indicating relay IW in the dispatcher's office, each time that the message channel connecting the contact 155 with the relay IW is completed. Let us now consider how this channel circuit is completed, said channel including the brushes 3 and the segment 161 of the commutator 27.

Let us assume that the commutator 27 takes the position in which segments 104, 100 and 105 have just disengaged, their respective stationary brushes. All of the various distinctive frequency relays will of course then have assumed their retracted position, as also will have their respective repeater relays. A slight further rotation in the commutator 27, causes the segment 156 to engage stationary contacts 45, thereby applying frequency $F^1$ to the selecting circuit and effect energization of the relays $WR^1$, and $ER^1$, which relays upon assuming their energized position will close the circuits heretofore traced for the repeater relays $WRR^1$ and $ERR^1$ to cause energization of such repeater relays. A moment later the segment 157 of the commutator 27 will engage the stationary brushes 108, and will apply frequency $F^n$ to the stepping circuit. The superimposition of the frequency $F^n$ upon the selecting circuit will of course pick up the relays $WR^n$ and $ER^n$, but since the contact 48 of the relay $WR^1$ is in its attracted position and the contact 51 of the relay $ER^1$ is in its attracted position, this picking up of the relays $WR^n$ and $ER^n$ will not effect energization of either of the relays $WRR^n$ or $ERR^n$. The relays $WR^1$, $WRR^1$, $WR^n$, $ER^1$, $ERR^1$ and $ER^n$ are now in their energized position. Let us now see what the result will be when the segment 160 of the commutator 27 engages the stationary contact brushes 69, which will of course apply current of frequency $F^2$ to the stepping circuit. Since there is no relay at the way station No. 2 which responds to frequency $F^2$, no further consideration of the apparatus at way station No. 2 is necessary. Also, there will be no message channel completed at this way station, because frequency $F^3$ must be transmitted to complete a message circuit at way station No. 2 for reasons already given. At way station No. 1, however, the application of frequency $F^2$, causes the relay $WR^2$ to assume its attracted position, the repeater relay $WRR^2$ not picking up because back contact 47 is open, thereby completing the following message circuit including these segments 161 at the dispatcher's office:—beginning at the negative terminal of the battery 176 (see station No. 1 Fig. 1B), back contact 155 of the track relay $TR^1$, wire 162, back contact 148 of the relay $WRR^n$, wire 147, front contact 88 of the relay $WR^n$, wire 87, front contact 86 of the relay $WRR^1$, wire 85, front contact 84 of the relay $WR^2$, wire 83, front contact 49 of the relay $WR^1$, wire 82, message wire 41, wire 81, brush 3, commutator segment 161, brush 3, wire 163, winding of the indicating relay IW, wire 164, to the common return wire C, connected through the medium of wires 93, 165, 166 and 167 to the midpoint of the battery 176 at way station No. 1.

The flow of current of negative polarity in the circuit just traced, causes the indicating relay IW to be moved to its left hand position, in which position its contact 168 will close an energizing circuit to the indicating lamp LW, thus informing the dispatcher that the train has accepted the signal 8SD and is entering into the side track of the passing siding PS.

Obviously, as soon as the train has passed off of the detector track circuit containing the track relay $TR^1$, this track relay $TR^1$ will assume its attracted position and will control the indicating relay IW back to its normal solid line position the next time that the channel circuit including the brushes 3 is completed. It is of course understood that the commutator 27, as it rotates continuously, successively completes the various channel circuits in sequential order, so that any control impulses that are to be transmitted, and any change in the positions of trains may be transmitted during the time that its particular channel circuit is completed.

Obviously, the dispatcher may return the switch machine $SM^1$ back to the normal straight track position by returning his lever LSMW to the right hand position, and similarly the take siding signal 8SD may be returned to the stop position, by the dispatcher returning his signal lever LSW to the middle neutral position.

Let us now see how channel circuit No. 6 may be completed. Let us assume that commutator 27 continues to operate, it now assuming a position where contacts 120, 140, 141 and 142 just disengage their respective stationary brushes. Upon a slight further turning of this commutator 27 segment 170 engages the brushes 108, and applies frequency $F^n$ to the selecting circuit. This application of frequency $F^n$ to the selecting circuit effects picking up of relays $WR^n$ and $ER^n$, which in turn effects picking up of the relays $WRR^n$ and $ERR^n$, for reasons already given. A further small angle of rotation of drum 27 causes the segment 171 to engage the brushes 69, thereby applying frequency $F^2$ to the selecting circuit and effecting energization of the relay $WR^2$ thereby effecting energization of the relay $WRR^2$ by closure of the pick-up circuit for this relay $WRR^2$ heretofore closed. Since there is no relay at station No. 2 which responds to frequency $F^2$, way station No. 2 may be disregarded for the present. After another small angle of rotation of the commutator 27 the segment 172 engages brushes 45, thereby applying frequency $F^1$ to the selecting circuit, and effecting picking up of the relays $WR^1$ and $ER^1$. The picking up of relay $ER^1$ may be disregarded since no message circuit can be completed at way station No. 2 without the transmission of frequency $F^3$, which has not been done. At way station No. 1 the picking up of relay $WR^1$ does not effect picking up of relay $WRR^1$, because the back contact 124 in the pick-up circuit of relay $WRR^1$ is open, and the following channel circuit portion, which may be used for indicating another track circuit or the position of the switch machine, or the like, is completed:—beginning at the wire marked "No. 6 channel" (see station No. 1), front contact 117 of relay $WRR^n$, wire 116, front contact 115 of relay $WR^n$, wire 114, front contact 113 of relay $WRR^2$, wire 112, front contact 84 of $WR^2$, wire 83, front contact 49 of relay $WR^1$, wire 82, message wire 41, wire 81 (see Fig. 1A), contacts 6—173, to a wire which may be connected to a suitable indicating relay. If desired this unused channel may also be used for carrying out an additional control such as the operation of a derail, or the indication of occupancy of another track circuit.

Having now explained how the various control relays at the west end of the passing siding PS may be controlled from the dispatcher's office, and having explained how the track relay $TR^1$ effects illumination of the indicating lamp LW at the dispatcher's office, it should be understood that the apparatus at way station No. 2 may be controlled, and the track relays $TR^2$ at way station 2 may control the indicating relay IE, in exactly the same manner as explained in connection with way station No. 1, except that frequency $F^3$ is used at way station No. 2 in each case where frequency $F^2$ is used for way station No. 1. In other words, the interconnections between the various distinctive frequency relays and their repeater relays at all way stations are exactly the same but these relays in some instances are located at different locations. Putting it another way, similar codes are used for controlling the apparatus at way station No. 2 as are used at way station No. 1, except that frequency $F^3$ is substituted for frequency $F^2$, these codes consisting of specific distinctive frequencies applied in specific distinctive order. Similarly way station 3 (not shown) is controlled by codes (see commutator segments for station No. 3) exactly the same as those used for controlling way station No. 2, except that distinctive frequency $F^2$ is substituted for distinctive frequency $F^1$ used at way station No. 2. In other words, way station No. 1 is controlled by the employment of frequencies $F^n$, $F^1$ and $F^2$; way station No. 2 is controlled by frequencies $F^n$, $F^1$ and $F^3$; and, way station 3 (not shown) is controlled by frequency $F^n$, $F^2$ and $F^3$, these frequencies in each case being applied in distinctive order.

Applicant has thus disclosed a synchronous selector system in which a message circuit extending along the entire railway system is rendered available for completing many message circuits, in which in accordance with the present invention one branch is located at the dispatcher's office and the other branch is located at a particular way station, these branches being simultaneously or synchronously connected to the message wire through the medium of a commutator contact in the dispatcher's office and a plurality of relay contacts at the way station, which contacts are closed by applying specific frequencies to a selecting circuit in a specific order. From this consideration it appears that the present system does not require re-synchronization of devices, in that the devices at the way stations are operated by a plurality of distinctive codes, consisting of distinctive frequencies following each other in a distinctive order, each code of which when completed returning the system to its normal condition. Also, the codes which are employed in the particular system illustrated to show one embodiment of the invention are of a nature which require only a few impulses, and therefore only a very short time to effect the consummation of these codes, since they take advantage of distinctive frequency as well as distinctive application of these frequencies. This arrangement therefore makes it possible for a very large number of combinations and permutations to be taken advantage of for a comparatively few frequencies, and also makes it possible to scan, so to speak, the entire railway system, by successively establishing all of the message circuits in a comparatively short time or cycle (one revolution of commutator).

Applicant has made a study of the number of distinctive message channels that may be completed by employing a particular number of distinctive frequencies and finds the following to be the case. If four frequencies are used 18 different channel circuits will be made available as illustrated in the particular showing illustrated in the drawings. If on the other hand five frequencies are used in groups of three, 36 channels will be rendered available. If six frequencies are used 60 channel circuits will be made available, if seven frequencies are employed 90 channel circuits will be rendered available, and so on, so that if 10 frequencies are employed 216 distinctive channel circuits each included in the same line wire may be rendered available sequentially. Also, if desired, suitable circuit interrupting means, for chopping up current derived from a battery may be employed for feeding the filters to obtain alternating currents of various frequencies, may be used instead of the generators $F^n$, $F^1$, $F^2$ and $F^3$.

From the foregoing description, and by reference to the drawings, it will be noted that combinations of frequencies concurrently effective are used for selecting way stations and the order in which such frequencies are applied determines the particular message channel that shall be completed at such way station. Another distinctiveness between various code combinations resides in the number of different frequencies employed in the same code. For instance, the first and second code, as apparent from the first and second horizontal row of segments on the commutator 27, employ only two distinctive frequencies, whereas the third code employs three distinctive frequencies. Each code may employ one or more of these three characteristics of variability "number of frequencies", "kinds of frequencies" and the "order of application of frequencies". Also, it is readily understood that if it were desired to render available the use of two message channels only at one particular way station, that the relays $R^n$ and $RR^n$ could then be omitted at such way station; and further the remaining four channels could be made use of at another location. From these considerations it is understood that the various channels rendered available by a system embodying the present invention may be distributed for use along a railway system in any manner desired, it merely being necessary to provide the proper relays to establish such message channels.

Having thus shown and described one rather specific embodiment of the present invention, and having illustrated the various elements of the system rather conventionally, it is desired to be understood that the particular circuit arrangement selected has been selected for the purpose of facilitating description of the invention as well as its operating characteristics, and that this particular embodiment has not been selected for the purpose of showing the scope of the invention or the exact construction preferably employed in practicing the same, and that various changes, modifications and additions may be made to adapt the invention to the particular railway system or dispatching system to which the invention is to be applied, all without departing from the spirit or scope of the invention or the idea of means underlying the same, except as demanded by the scope of the following claims.

What I claim as new is:

1. In a train dispatching system of the synchronous selector type, the combinations with a selector circuit and a message circuit, means at a dispatcher's office for applying a plurality of distinctive currents to said selector circuit in distinctive order, one relay for each distinctive current at a distant way station responsive only to such distinctive current, contacts at said way station in said message circuit closed in accordance with the order in which said relays assume their energized positions, contacts in said message circuit at said dispatcher's office closed when said first mentioned contacts are closed, and means for transmitting a message current over said message circuit.

2. A train dispatching system comprising; a dispatcher's office; a plurality of way stations; a control wire, a message wire and a common return wire connecting said dispatcher's office and way stations; contacts at said dispatcher's office and at each of said way stations for establishing a plurality of message channels each including said message wire, and means for transmitting a plurality of codes over said control and common wire successively to close said contacts at said way stations and for simultaneously therewith closing corresponding contacts at said dispatcher's office to successively establish said message channels, and means for transmitting messages over said message channels.

3. A train dispatching system comprising; a dispatcher's office; a plurality of way stations; a control wire, a message wire and a common return wire connecting said dispatcher's office and way stations; contacts at said dispatcher's office and at each of said way stations for establishing a plurality of message channels each including said message wire, and means for transmitting a plurality of codes each including currents of distinctive frequency over said control and common wire successively to close said contacts at said way stations and for simultaneously therewith closing corresponding contacts at said dispatcher's office to successively establish said message channels, and means for transmitting messages over said message channels.

4. A train dispatching system comprising; a dispatcher's office; a plurality of way stations; a control wire, a message wire and a common return wire connecting said dispatcher's office and way stations; contacts at said dispatcher's office and at each of said way stations for establishing a plurality of message channels each including said message wire; and means for transmitting a plurality of codes each including currents of distinctive frequency applied in a distinctive sequence over said control and common wire successively to close said contacts at said way stations and for simultaneously therewith closing corresponding contacts at said dispatcher's office to successively establish said message channels, and means for transmitting messages over said message channels.

5. A train dispatching system comprising; a dispatcher's office; a plurality of way stations; a control wire, a message wire and a common return wire connecting said dispatcher's office and way stations; contacts at said dispatcher's office and at each of said way stations for establishing a plurality of message channels each including said message wire; and means for transmitting a plurality of codes over said control and common wire successively to close said contacts at said way stations and for simultaneously therewith closing corresponding contacts at said dispatcher's office to successively establish said message channels; indicating means at said dispatcher's office; and track circuit controlled means at one of said way stations for controlling said indicating means over one of said message channels.

6. A train dispatching system comprising; a dispatcher's office; a plurality of way stations; a control wire, a message wire and a common return wire connecting said dispatcher's office and way stations; contacts at said dispatcher's office and at each of said way stations for establishing a plurality of message channels each including said message wire; and means for transmitting a plurality of codes over said control and common wire successively to close said contacts at said way stations and for simultaneously therewith closing corresponding contacts at said dispatcher's office to successively establish said message channels; traffic controlling means at one of said way stations; and means at said dispatcher's office for controlling said traffic controlling means over one of said intermittently established message channels.

7. In a system for independently controlling a large number of devices over the same line circuit comprising, a selector circuit connecting a large number of distinctively responsive devices, means for applying distinctive currents to said selector circuit to actuate a certain one of said devices to close contacts of said device, and a message circuit including part of said selector circuit and including said contacts.

8. In a system for independently controlling a large number of devices over the same line circuit comprising, a selector circuit connecting a large number of distinctive frequency responsive devices, means for applying a distinctive frequency to said selector circuit to actuate a certain one of said devices to close contacts of said device, and a message circuit including part of said selector circuit and including said contacts.

9. In a system for independently controlling a large number of devices over the same line circuit comprising, a selector circuit connecting a large number of distinctive frequency responsive devices, means for applying a plurality of distinctive frequencies to said selector circuit in distinctive order to actuate certain ones of said devices to close contacts of said devices, and a message circuit including part of said selector circuit and including said contacts.

10. In a railway signal control system, the combination with the usual trickle charge line extending along the railway track having alternating current applied thereto and feeding rectifiers at various signal locations charging storage batteries, of a filter inserted between each rectifier and said trickle charge line, a plurality of different distinctive frequency responsive relays connected to said line, means for applying frequencies to which certain of said relays will respond in various combinations to effect energization of certain of said relays, a message circuit extending along said railway track including front contacts of said certain relays in series, and means for controlling a railway signal over said message circuit.

11. In a railway signal control system, the combination with the usual trickle charge line extending along the railway track having alternating current applied thereto and feeding rectifiers at various signal locations charging storage batteries, of a filter inserted between each rectifier and said trickle charge line, a plurality of different distinctive frequency responsive relays connected to said line, means for applying frequencies to which certain of said relays will respond in various combinations of kind and order to effect energizations of certain said relays in a predetermined order, other relays controlled by said certain relays depending on the order in which they were energized, a message circuit extending along said railway track including front contacts of said other relays in series, and means for controlling a railway signal over said message circuit.

12. In a railway signal control system, the combination with the usual trickle charge line extending along the railway track having alternating current applied thereto and feeding rectifiers at various signal locations charging storage batteries, of a filter inserted between each rectifier and said trickle charge line, a plurality of different distinctive frequency responsive relays connected to said line, means for applying frequencies to which certain of said relays will respond in various combinations to effect energizations of certain of said relays, a message circuit extending along said railway track including front contacts of said certain relays in series, a track switch at said signal location, a switch machine for controlling said track switch, and means for controlling said switch machine over said message circuit.

13. In a railway signal control system, the combination with the usual trickle charge line extending along the railway track having alternating current applied thereto and feeding rectifiers at various signal locations charging storage batteries, of a filter inserted between each rectifier and said trickle charge line, a plurality of different distinctive frequency responsive relays connected to said line, means for applying frequencies to which certain of said relays will respond in various combinations to effect energizations of certain of said relays, a message circuit extending along said railway track including front contacts of certain relays in series, a track switch at said signal location, a switch machine for controlling said track switch, signals associated with said track switch, and means for controlling said switch machine and said signals over said message circuit.

14. In a train dispatching system of the synchronous selector type, the combination with a selector circuit connecting a dispatcher's office and a plurality of way stations, a combination of distinctive frequency responsive relays at each way station the combination of which is different than that at every other way station even though several way stations have some of their relays responsive to the same frequency, other relays at each way station controlled in accordance with the order in which the distinctive frequency responsive relays at such way station have been energized, a message circuit including contacts of said distinctive frequency responsive relays and of said other relays, and means for applying alternating currents of different frequencies to said selector circuit in groups in predetermined combinations.

15. In a train dispatching system of the synchronous selector type, the combination with a selector circuit connecting a dispatcher's office and a plurality of way stations, a combination of distinctive frequency responsive relays at each way station the combination of which is different than that at other way stations even though several way stations have relays responsive to the same frequency, other relays at each station controlled in accordance with the order in which the distinctive frequency responsive relays at such way stations have been energized, message circuits including contacts of said distinctive frequency responsive relays and of said other relays, and means for applying alternating currents of different frequencies to said selector circuit in predetermined combinations, each combination of frequencies of which is applied in several predetermined orders to close several different message circuits.

16. In a train dispatching system of the synchronous selector type, the combination with a selector circuit connecting a dispatcher's office and a plurality of way stations, a combination of distinctive frequency responsive relays at each way station the combination of which is different than that at every other way station even though several way stations have some relays responsive to the same frequency, other relays at each way station controlled in accordance with the order in which the distinctive frequency responsive relays at such way station have been energized, message circuits including contacts of said distinctive frequency responsive relays and said other relays, and means for applying alternating currents of different frequencies to said selector circuit in predetermined combinations and predetermined permutations to effect closure of predetermined message circuits.

17. In combination, a railway system, a central office from which train movements over said system may be directed, a plurality of way stations, a signal at each way station, a line circuit connecting said central office and said way stations, means for distinctively controlling said signals over said circuit including code creating mechanism at said central office and code responsive mechanism at said way stations for respectively creating and deciphering codes of which each code comprises a plurality of distinctive frequency impulses in a distinctive order, and a message circuit connecting a particular way station with said central office rendered effective by a particular code.

18. In combination, a railway system, a central office from which train movements over said system may be directed, a plurality of way stations, a track switch at each way station, a line circuit connecting said central office and said way stations, means for distinctly operating said track switches over said circuit including code creating mechanism at said central office and code responsive mechanism at said way stations for respectively creating and deciphering codes of which each code comprises a plurality of distinctive frequency impulses in a distinctive order, and a message circuit connecting a particular way station with said central office rendered effective by a particular code.

19. In combination, a railway system, a central office from which train movements over said system may be directed, a plurality of way stations, a track circuit at each way station, a line circuit connecting said central office and said way stations, means for distinctively indicating at said central office the occupancies of the various track circuits including code creating and code responsive devices for creating and deciphering codes each code of which comprises a plurality of distinctive frequency impulses, and a message circuit connecting a particular way station with said central office rendered effective by a particular code.

20. In combination, a railway system, a central office from which train movements over said system may be directed, a plurality of way stations, a signal at each way station, a line circuit connecting said central office and said way stations, and means for distinctively controlling said signals over said circuit including code creating mechanism at said central office and code responsive mechanism at said way stations for respectively creating and deciphering codes of which each code comprises a plurality of distinctive frequency impulses initiated in a distinctive order with each impulse maintained to the end of the code.

21. In combination, a railway system, a central office from which train movements over said system may be directed, a plurality of way stations, a track switch at each way station, a line circuit connecting said central office and said way stations, and means for distinctively operating said track switches over said circuit including code creating mechanism at said central office and code responsive mechanism at said way stations for respectively creating and deciphering codes of which each code comprises a plurality of distinctive impulses initiated in a distinctive order but all maintained to the end of the code.

22. In combination, a railway system, a central office from which train movements over said system may be directed, a plurality of way stations, a track circuit at each way station, a line circuit connecting said central office and said way stations, and means for distinctively indicating at said central office the occupancies of the various track circuits including code creating and code responsive devices for creating and deciphering codes each code of which comprises a plurality of distinctive frequency impulses transmitted in a distinctive order but all maintained to the end of the code.

23. A remote control system comprising an office and a plurality of stations connected by a plurality of selective frequency responsive communication channels each including the same line wire, a plurality of sources of periodic currents of different frequencies at the office, a distributor operable through successive cycles and effective during each cycle to connect said sources with said line wire selectively to produce a series of different signals, each series including a signal for each station, and means at each station selectively responsive to an individual one of said signals.

24. A remote control system comprising an office and a plurality of stations connected by a plurality of selective frequency responsive communication channels each including the same line wire, a plurality of sources of periodic currents of different frequencies at the office, a distributor operable through successive cycles and effective during each cycle to connect said sources with said line wire selectively to produce a series of different signals, each series including a signal for each station, and frequency responsive means at each station selectively responsive to an individual one of said signals.

25. A remote control system comprising an office and a plurality of stations connected by a plurality of selective frequency responsive communication channels each including the same line wire, a plurality of sources of periodic currents of different frequencies at the office, a distributor operable through successive cycles and effective during each cycle to connect said sources with said line wire selectively to produce a series of different signals, each series including a signal for each station, and selecting means at each station including a frequency responsive relay for each frequency of the signal individual to such station.

26. A remote control system comprising an office and a plurality of stations connected by a line wire, a device at each station, a control lever at the office for each device, a plurality of sources of periodic currents of different frequencies at the office, a distributor operable through successive cycles and effective during each cycle to connect said sources with said line wire selectively to produce a series of different signals one for each station, selecting means at each station each including a relay selectively responsive to each frequency of the signal individual to such station, a contact at each station actuated only when the selecting means at such station is operated by the signal individual to such station, and means including said contact for controlling the device at such station in accordance with the position of the corresponding lever.

27. Apparatus for indicating at a central office the condition of each of a plurality of devices located at different remote stations all connected with the office by a line wire comprising a distinctive combination of frequency responsive relays at each station, the combination of which is different from that at every other station, a selector at each station operated only when the frequency responsive relays at such station are actuated in accordance with the frequency combination for such station, an indicator at the office for each device, means controlled by each selector when operated for actuating the corresponding office indicator in accordance with the condition of the device at such station, and means at the office for applying periodic currents of different frequencies to said line wire in selected combinations to selectively operate said selectors.

28. In combination with an office and a plurality of stations connected by a line wire, a plurality of communication channels all including said line wire and each tuned to resonance at a different frequency, a plurality of sources of periodic current at the office each having a frequency corresponding to the resonant frequency of one of said channels, a distributor at the office operable through a series of positions and operating in each position to connect said sources selectively with said line wire to produce a distinctive code signal different from that produced in any other position, and receiving means at each station selectively responsive to the current in a combination of said channels unique to such station.

29. A selector system for distinctively controlling any one of a plurality of units over the same line circuit comprising, a line circuit connecting a local office and a distant station, code devices at said distant station each responsive if energized by a particular combination of distinctive frequency currents and connected to said line circuit, means at said local office for energizing said line circuit concurrently with a plurality of distinctive frequency currents, and units at said office one for each combination of distinctive frequency currents and each controlled only during the response of a particular code device and then controlled in accordance with a particular condition existing at said station.

30. A selector system for distinctively controlling any one of a plurality of devices over the same line circuit comprising, a line circuit connecting a local office and distant control points, devices at said distant control points each responsive if energized by a plurality of distinctive frequency currents if applied in a particular order and maintained co-extensively applied, and means at said local office for energizing said line circuit by distinctive frequency currents applied in a particular order but co-extensively maintained applied for a period of time.

31. A selector system comprising in combination, a local office and a plurality of stations, a single line wire connecting said office and all of said stations, distinctive frequency filter means at said office and at each way station to afford a plurality of distinctive frequency channels connecting said office and stations and each including said line wire, means at each way station responsive to a particular combination of concurrently effective frequencies, and cyclic means at said office for sequentially applying various combinations of concurrently present frequencies.

WILLIAM D. HAILES.